US008231465B2

(12) United States Patent
Yee et al.

(10) Patent No.: US 8,231,465 B2
(45) Date of Patent: Jul. 31, 2012

(54) LOCATION-AWARE MIXED-REALITY GAMING PLATFORM

(75) Inventors: Nicholas K. Yee, Mountain View, CA (US); Victoria M. E. Bellotti, San Francisco, CA (US); Nicolas B. Ducheneaut, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 862 days.

(21) Appl. No.: 12/035,264

(22) Filed: Feb. 21, 2008

(65) Prior Publication Data
US 2009/0215536 A1 Aug. 27, 2009

(51) Int. Cl.
*G06T 15/00* (2011.01)
(52) U.S. Cl. ............. 463/32; 345/419; 345/427; 463/31
(58) Field of Classification Search .................. 463/427, 463/32, 31; 345/427, 419
See application file for complete search history.

(56) References Cited

U.S. PATENT DOCUMENTS

| 6,183,364 B1 * | 2/2001 | Trovato | 463/32 |
| 2004/0239670 A1 * | 12/2004 | Marks | 345/419 |
| 2006/0223635 A1 * | 10/2006 | Rosenberg | 463/37 |
| 2006/0256081 A1 | 11/2006 | Zalewski | |
| 2007/0117608 A1 * | 5/2007 | Roper et al. | 463/16 |
| 2008/0252596 A1 * | 10/2008 | Bell et al. | 345/156 |

FOREIGN PATENT DOCUMENTS

| EP | 1117074 A2 | 9/2000 |
| WO | 0170358 A2 | 9/2001 |
| WO | 03081447 A1 | 10/2003 |
| WO | 2009000028 A1 | 12/2008 |

OTHER PUBLICATIONS

A Practical Design Flow of Noise Reduction Algorithm for Video Post Processing by S. Yang, IEEE Transactions on Consumer Electronics, vol. 53, No. 3, published Aug. 2007.*

* cited by examiner

*Primary Examiner* — Melba Bumgarner
*Assistant Examiner* — Syvila Weatherford
(74) *Attorney, Agent, or Firm* — Shun Yao; Park, Vaughan, Fleming & Dowler LLP

(57) ABSTRACT

One embodiment of the present invention provides a system that facilitates location-aware, mixed-reality gaming platform. During operation, the system determines a layout of a user's surrounding. The system further detects the user's location and/or nearby objects. Next, the system associates virtual content to the determined layout and associates a set of game rules with the virtual content. Subsequently, the system produces a visual and/or audio representation of a game based on the game rules and virtual content to the user, thereby allowing the user to play a game that corresponds to his surrounding and location.

21 Claims, 7 Drawing Sheets

LOCATION-AWARE MIXED-REALITY GAMING PLATFORM

FIELD OF THE INVENTION

The present disclosure relates to gaming systems. More specifically, the present disclosure relates to a location-aware, mixed-reality gaming platform that can overlay virtual content on a user's surrounding.

RELATED ART

The advances in sensing technology have allowed users to experience unprecedented interactive gaming experiences. For example, a wireless gaming controller equipped with accelerometers can detect the motion of the controller and facilitate precise control of the objects in a game. Furthermore, such controllers can allow a user to move freely in the 3-D space and provide a much more intuitive gaming experience.

However, present gaming consoles still require a user to be situated in front of a display. Even with the state-of-art 3-D motion-detection technology, the user's motion is constrained to a limited space near the gaming console. In addition, the motion detection is limited to the movements of the controller in the user's hand, and can only be used to control the movement of an object, such as a character, a weapon, or an instrument, within a game.

SUMMARY

One embodiment of the present invention provides a system that facilitates location-aware, mixed-reality gaming platform. During operation, the system determines a layout of a user's surrounding. The system further detects the user's location and/or nearby objects. Next, the system associates virtual content to the determined layout and associates a set of game rules with the virtual content. Subsequently, the system produces a visual and/or audio representation of a game based on the game rules and virtual content to the user, thereby allowing the user to play a game that corresponds to his surrounding and location.

In a variation on this embodiment, determining the layout of the user's surrounding involves computing the dimension of a room by triangulation based on wireless signals.

In a further variation, determining the layout of the user's surrounding involves determining a reference point based on the wireless signals.

In a variation on this embodiment, detecting the nearby objects involves detecting Radio-frequency Identification (RFID) signals from RFID tags attached to the objects and inferring the object locations based on the current location of the system and the RFID signals.

In a variation on this embodiment, the virtual content includes at least one of: a person, an event, an object, and a place. The virtual content further includes a digital record that carries visual, audio, or textual information.

In a variation on this embodiment, the system allows the user to review, edit, and add to the virtual content.

In a variation on this embodiment, the system allows the user to review, edit, and add to the game rules.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims. In addition, although embodiments of the present invention are described with examples in the English language, application of the present invention is not limited to English, but can be extended to any language, such as eastern Asian languages, including Japanese, Korean, and Chinese.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a gaming system that facilitates a location-aware, mixed-reality gaming platform. This system can detect the layout of a user's home, detect the location of the user and objects in the rooms, and attach virtual content to the layout. In one embodiment, this gaming platform runs on a hand-held device and allows the user to play a game in an alternate reality that corresponds to the actual reality in his surrounding. As a result, the user can enjoy more realistic, interactive, and intuitive game playing.

Figure 1:
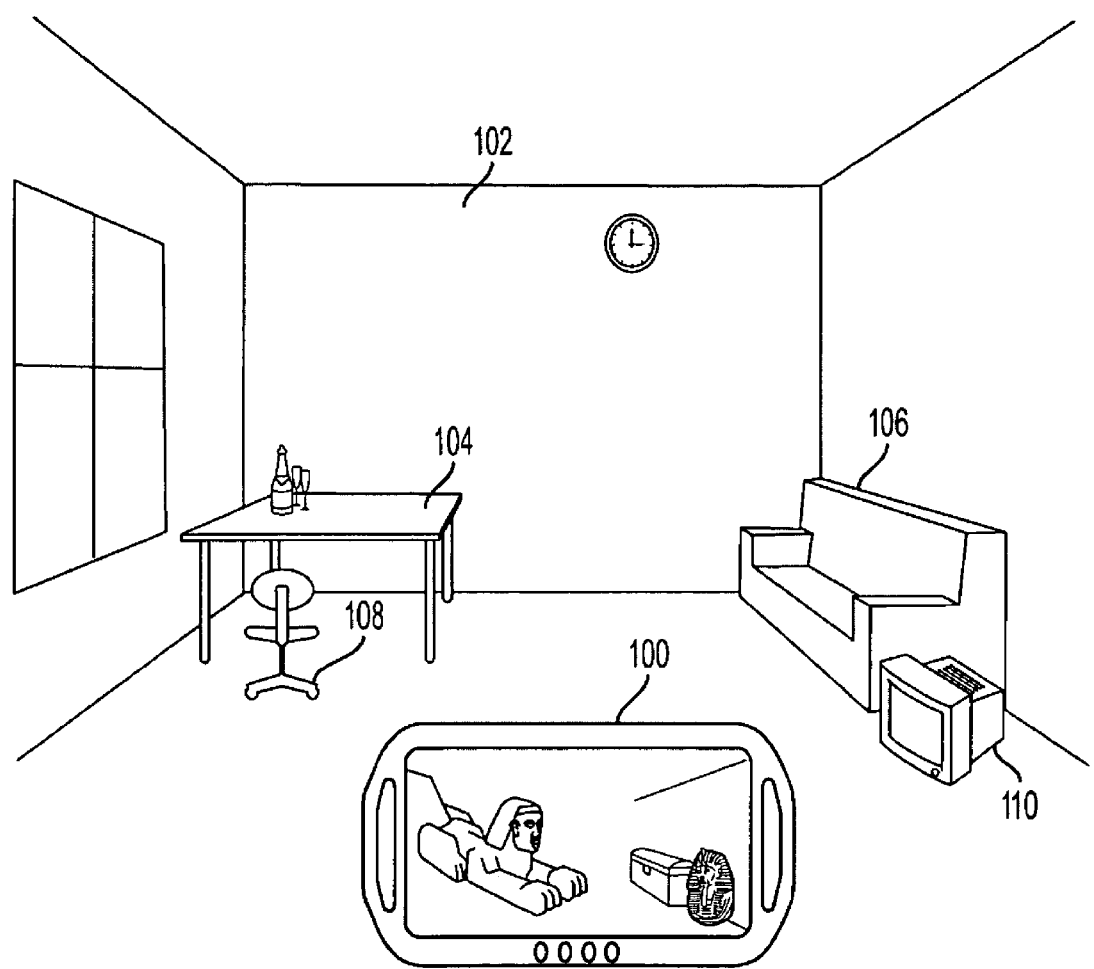
FIG. 1 illustrates an exemplary portable gaming system that facilitates a location-aware mixed-reality gaming platform, in accordance with one embodiment of the present invention.

FIG. 1 illustrates an exemplary portable gaming system that facilitates a location-aware mixed-reality gaming platform, in accordance with one embodiment of the present invention. In this example, a user brings a hand-held gaming device 100 into a room 102. Inside room 102 are a number of objects, including a table 104, a chair 108, a couch 106, and a TV 110. When the user brings hand-held device 100 to room 102, hand-held device 100 can detect the layout of room 102 as well as the location of the objects. Hand-held device 100 then attaches a set of virtual content to at least some of the objects according to the room layout.

As illustrated in FIG. 1, hand-held device 100 attaches a set of "Egyptian Treasure Hunt" content to the layout of room 102. For instance, as displayed on hand-held device 100, couch 106 corresponds to a treasure chest; TV 110 corresponds to a mysterious bust; and table 104 and chair 108 correspond to a Sphinx statue. The gaming platform on hand-held device 100 then applies a set of game rules to this alternate reality, in which the user can play an Egyptian treasure-hunt game. Note that as the user moves around in room 102, the alternate reality displayed on hand-held device 100 changes accordingly. In some embodiments, the game allows the user to interact with the items displayed on hand-held device 100 by interacting with the corresponding objects in real life. For example, the user can open the treasure chest in the game when he is sufficiently close to couch 106. This way, the user can easily relate the game to his actual surrounding.

Note that any game can be associated with the alternate reality overlaid on the user's surrounding. For example, such games can include a crime scene investigation, a Jurassic dinosaur hunt, an Egyptian construction game, and so forth. Furthermore, in different games, different virtual content can be attached to the user's home. For instance, in a crime scene investigation, the user's home may be overlaid with an 18th century mansion. Furthermore, the real locations that are detected by the system do not need to be in the user's home. Such locations can be in a garden, club, school, mall, or any other environment.

In one embodiment, hand-held device 100 is equipped with motion-sensing mechanisms, such as 3-D accelerometers, as well as wireless communication devices. Hand-held device 100 may be further supported by a variety of other sensors in the home environment, such as wireless sensor motes, RFID tags, or webcams, to facilitate detection of the user's location and objects.

Without losing generality, the system can (1) gather information about the physical layout of the user's home and objects in the space; (2) attach virtual content to physical locations and objects; (3) provide a game architecture in relation with the virtual content; and (4) provide authoring tools for users to view, edit, and add virtual content and game rules in relation with the physical locations and objects. The next section describes these operations in detail.

System Details

Figure 2:
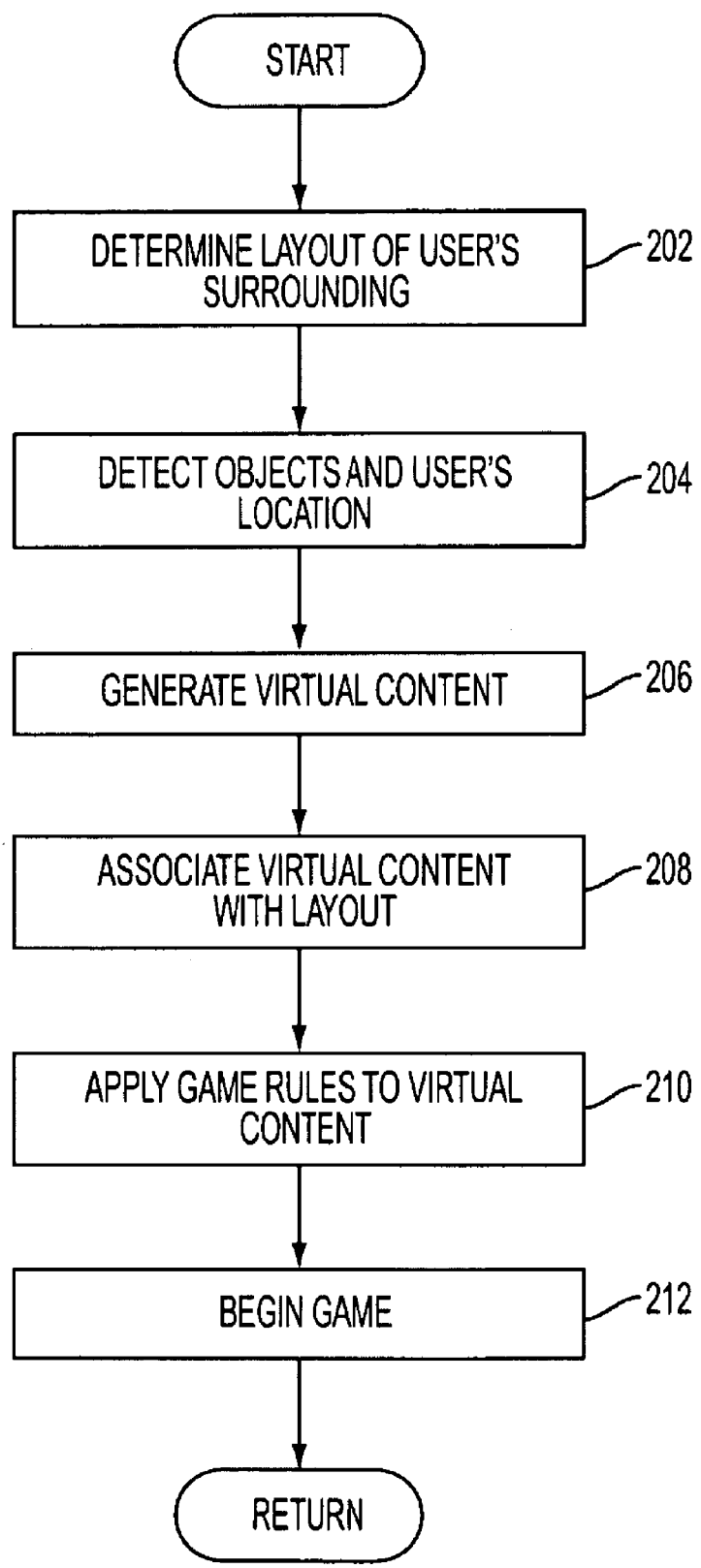
FIG. 2 presents a flowchart illustrating an exemplary process of configuring a location-aware, mixed-reality game in accordance with an embodiment of the present invention.

FIG. 2 presents a flowchart illustrating an exemplary process of configuring a location-aware, mixed-reality game in accordance with an embodiment of the present invention. During operation, the system first determines the layout of a user's surrounding (operation 202). The system further detects the objects in the surrounding and the user's location (operation 204).

Next, the system generates a set of virtual content (operation 206), and associates the virtual content with the layout of the user's surrounding (operation 208). Subsequently, the system applies a set of game rules to the virtual content (operation 210). The system then begins the game (operation 212). The description in conjunction with FIGS. 3-6 provides further details of these operations.

Figure 3:
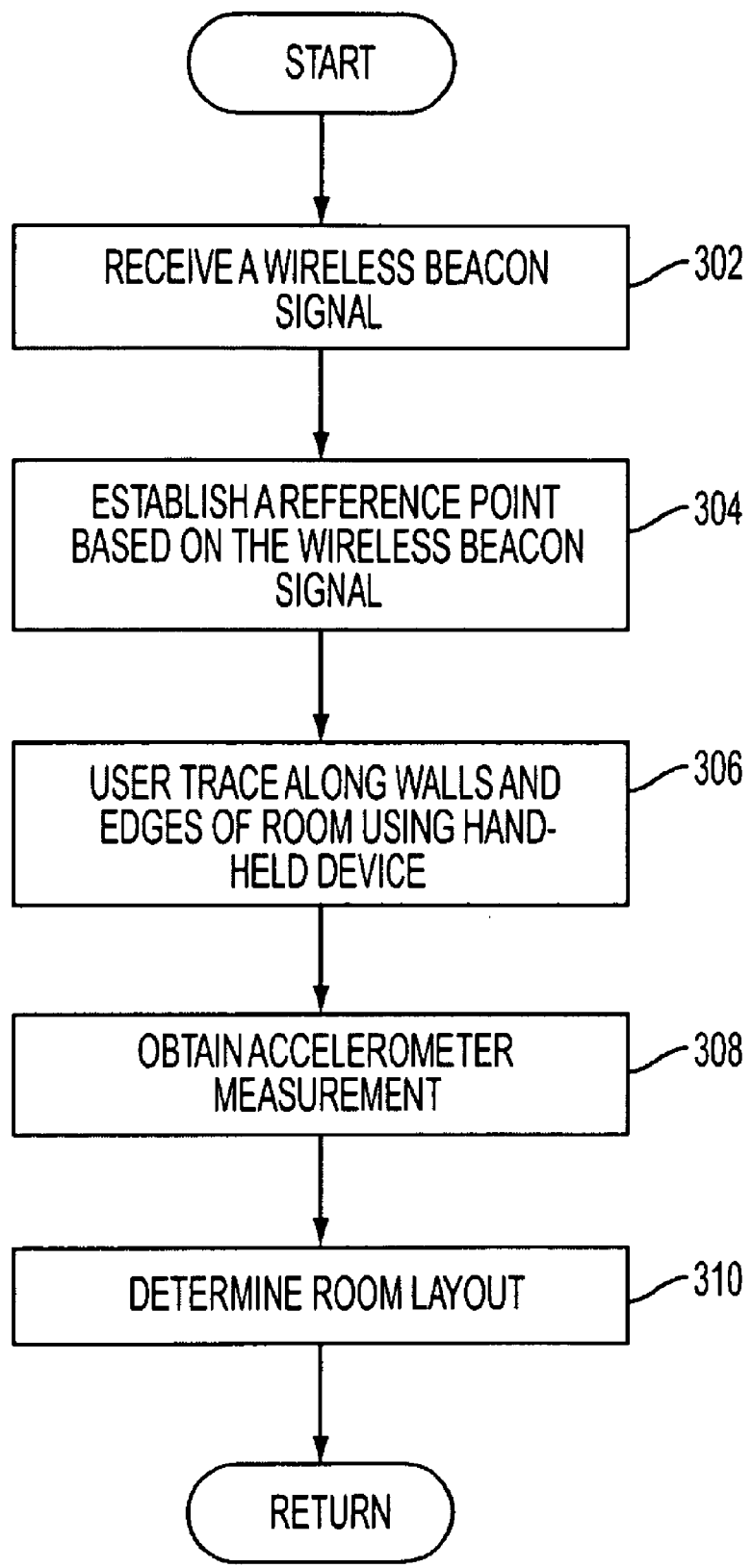
FIG. 3 presents a flowchart illustrating an exemplary process of determining the layout of a room where a user is located, in accordance with an embodiment of the present invention.

FIG. 3 presents a flowchart illustrating an exemplary process of determining the layout of a room where a user is located, in accordance with an embodiment of the present invention. In general, a variety of location-sensing technologies can be used with the present system for determining the layout of a room. Such technologies include Zigbee, WiFi, Bluetooth, and Ultra-Wideband (UWB)-based communication techniques. In one embodiment, the room is equipped with a number of wireless transmitters, which serve as beacons for the receiver, i.e., the hand-held device, to find a reference point. Note that it may not be required to have a beacon transmitter in each room. As long as the wireless transmission can penetrate the walls, one wireless beacon transmitter can serve multiple rooms. In some embodiments, two or more wireless beacon transmitters are used in the user's home for triangulation purposes.

As illustrated in FIG. 3, during operation, the system first receives at least one wireless beacon signal (operation 302). The system then establishes the reference point based on the wireless beacon signal (operation 304). Subsequently, the user traces along the walls and edges of the room using the hand-held device (operation 306). In one embodiment, the user can press and hold a button on the hand-held device while tracing the wall or edge, and release the button when he reaches the end of the wall or edge. The accelerometers within the hand-held device can detect the direction and distance of the user's tracing action. In a further embodiment, the system also asks the user to mark the doorways such that the connections between rooms can be stored by the system as well.

Next, the system obtains the accelerometer measurement (operation 308). Based on the reference point and accelerometer measurement, the system determines and stores the room layout (operation 310). Note that this layout-determination process is only one way to implement the present system. Other technologies, such as those based on infrared, audio, or laser signals, can also be used.

Figure 4:
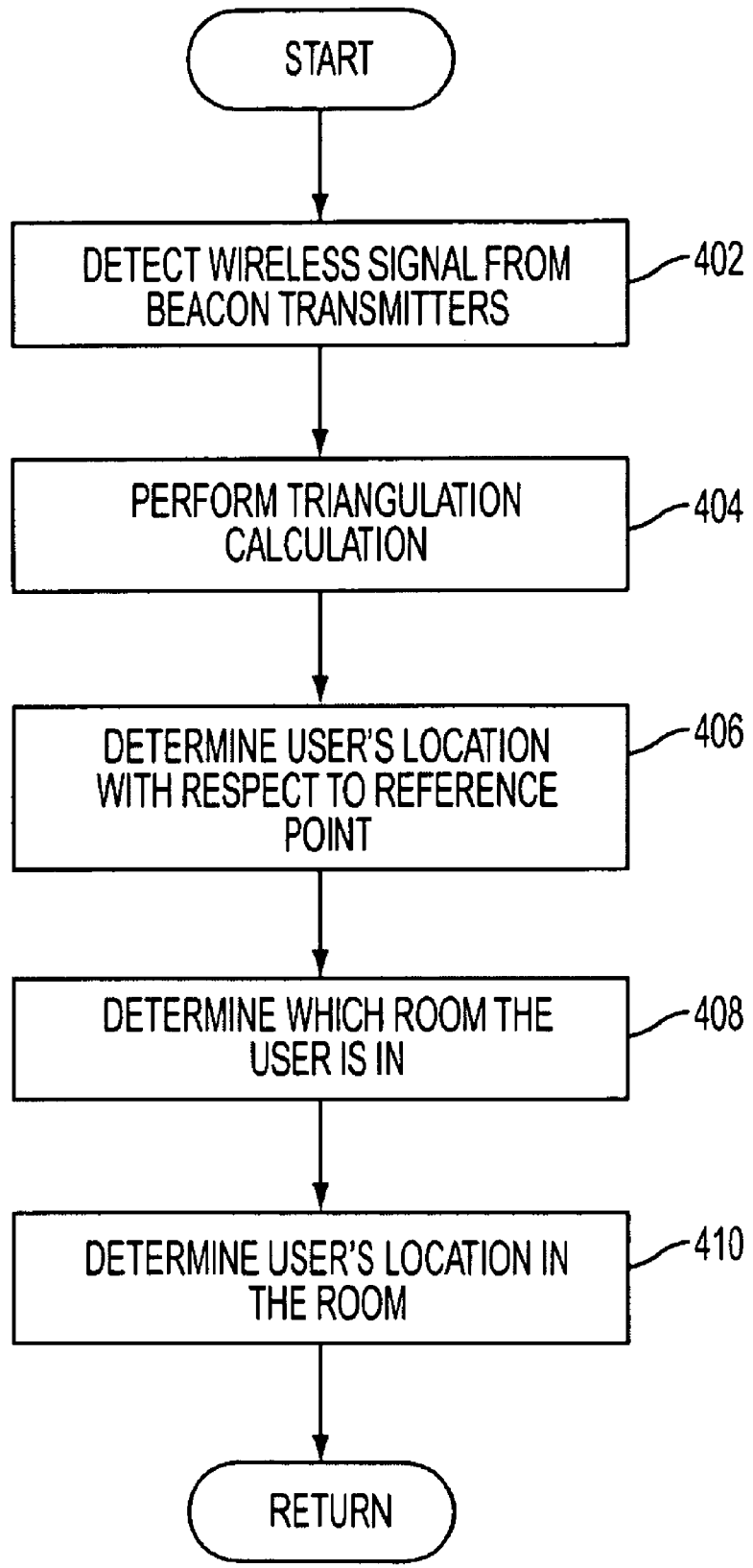
FIG. 4 presents a flowchart illustrating the process of determining a user's location within a room, in accordance with an embodiment of the present invention.

FIG. 4 presents a flowchart illustrating the process of determining a user's location within a room, in accordance with an embodiment of the present invention. In one embodiment, the same beacon transmitters used for the room-layout calculation can be used for detecting the user's location. During operation, the system receives the wireless beacon signal (operation 402). The system then performs triangulation calculation based on the received beacon signal (operation 404). Next, the system determines the user's location with respect to the reference point, which in one embodiment can be determined during the process of room-layout calculation (operation 406). Based on the user's location and previously stored layout information, the system can further determine which room the user is in (operation 408) and the use's location within the room (operation 410). In one embodiment, if the system makes an error in detecting the user's location, the user can manually correct the error by navigating to the correct location in the alternate reality displayed by the system.

In one embodiment, the system can also detect the location of objects in a room using, for example, Radio-frequency Identification (RFID) tags. The user can place an RFID tag on an object, such as a TV, and then use the hand-held device to detect the location of the object by detecting the RFID signal reflected by the RFID tag.

Figure 5:
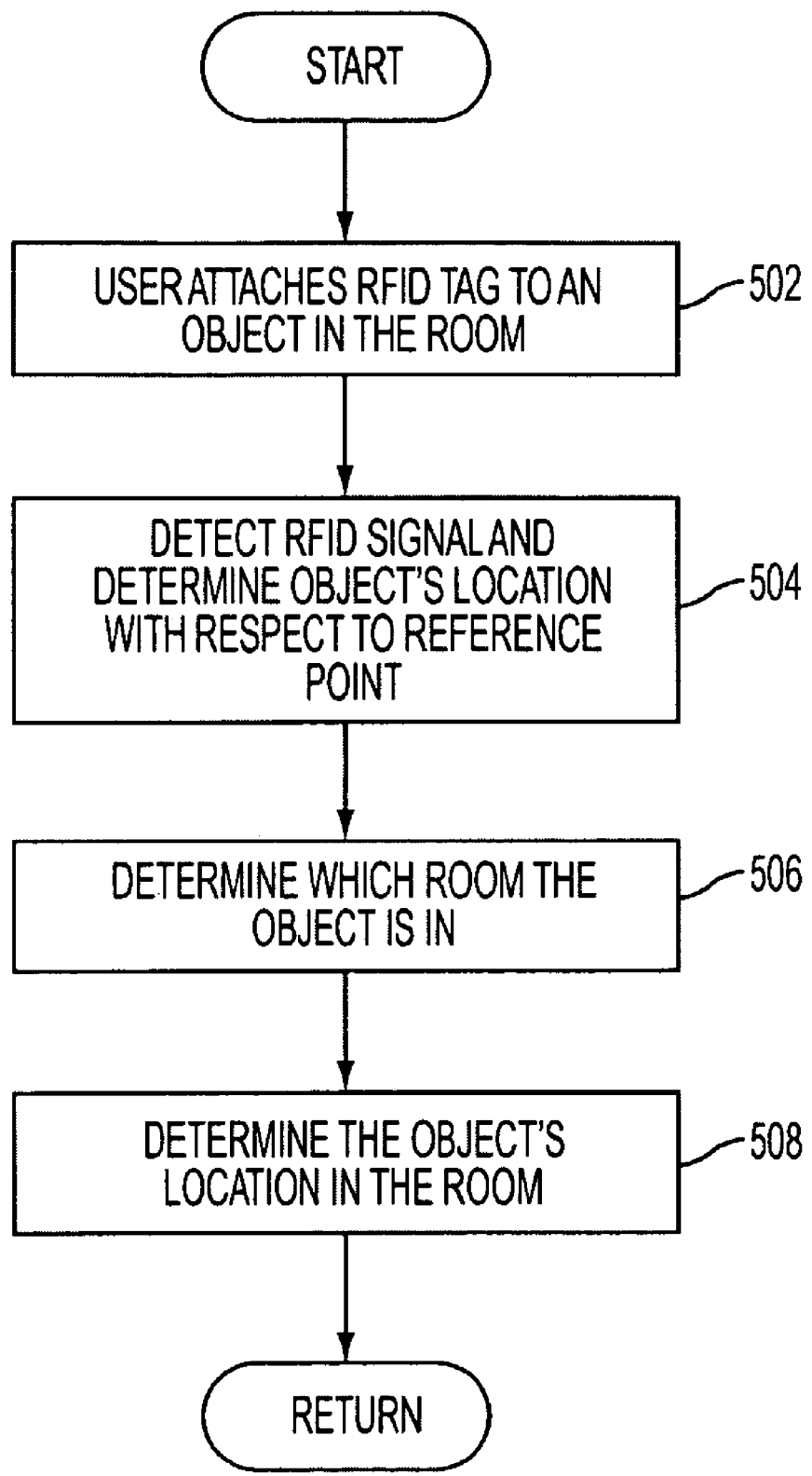
FIG. 5 presents a flowchart illustrating the process of determining the location of an object within a room, in accordance with an embodiment of the present invention.

FIG. 5 presents a flowchart illustrating the process of determining the location of an object within a room, in accordance with an embodiment of the present invention. During operation, the user first attaches an RFID tag to an object (operation 502). The system then detects the RFID signal and determines the location of the corresponding object with respect to a reference point (operation 504). Note that a variety of RFID localization techniques can be used here. In one embodiment, the system has one receiver and can use the strength of short-range RFID signal to identify objects in close vicinity of the hand-held device. In further embodiments, the system can be equipped with two directional antennas and detect an RFID tag's location based on the signal strength measured by the two antennas. Other localization techniques based on passive or active RFID tags are also possible.

After the object's location is determined, based on previously stored room layout information, the system further determines which room the object is in (operation 506) and the object's location in the room (operation 508). Note that, in one embodiment, the system can detect static objects by location proximity without requiring the user to tag the objects.

After determining the room layout and object locations, the system can attach a set of virtual content to the physical locations and objects. The virtual content can represent an alternative reality that is overlaid on the actual reality. In one embodiment, the virtual content can include a variety of items, such as people, places, objects, etc. In general, the virtual content can include any information that can be present in a game. The virtual content can also include a variety of digital records. These records can carry visual information, such as static graphical images, animations, and video clips; audio information, such as long ambient audio tracks and short, recorded sound clips and effects; and textual information, such as long texts and short annotations.

The system can overlay virtual content on the physical room and object layout in a variety of ways. In one embodiment, the system can assign an alternate reality to particular rooms. For example, the system can designate the kitchen as a forensics laboratory. The system can also assign a static object to a particular room. For example, the system can designate the northwest corner of the kitchen as the location of a centrifuge. In a further embodiment, the system can display graphical content or broadcast audio content via other digital media devices in the home. For example, when the user approaches the television, the television might show a video clip relevant to the game.

In further embodiments, the system can assign an alternate meaning to a physical object by asking the user to attach an RFID tag to an object and scanning the RFID tag with the hand-held device, such that the RFID code can be associated with the virtual object in the alternate reality. Hence, when the hand-held device detects the RFID code during the game, it can retrieve the virtual object associated with the RFID code.

In one embodiment, the system can randomly select or ask the user to select a theme from a library, and automatically overlays the user's home with the virtual content associated with the selected theme. For example, if the user selects the "crime scene" theme, the system can add content related to this theme to the user's home.

In a further embodiment, the system can allow the user to select the alternate reality theme and then to manually assign specific virtual content to specific locations and objects.

After attaching the virtual content to the user's home, the system then provides a game architecture around the virtual content. In one embodiment, the system uses pre-defined templates to apply different game rules to the virtual content. By applying the game rules, the system can "build" a game around the virtual content by ensuring that (1) there is a perceived end game state or game goal; (2) the user can interact with the virtual objects and locations; and (3) specific interactions can allow the user to progress towards the end game state or game goal.

The following exemplary game rules can be composited and interwoven to provide a structure for the game. (In the following description, the term "objects" encompasses virtual characters.)

1. The user has to find a particular static object or a set of objects (e.g., the user's location must be less than a predetermined distance, e.g., six inches, from the object's location).

2. The user has to view or explore a particular object or location, or a set of objects or locations (e.g., the user has to be in a particular room or be near a particular object).

3. The user has to place two or more objects next to each other (e.g., the user must be near two objects at the same time).

4. An object has to be brought to a particular location or a set of locations (e.g., the distance between an object and a particular location must be less than 1 m).

In one embodiment, the game rules can be modified in the following ways:

1. The goal can only be completed in a specified location.

2. The goal has to be completed in a specified amount of time.

3. The goal can only be completed after a specified amount of time has passed.

4. The goal can only be completed after one or more other goals have been completed.

5. In a game with multiple users, only certain users can complete certain goals.

6. In a game with multiple users, the goal can only be completed when one or more other users are nearby.

In some embodiments, the system can also allow the user to view, edit, and add virtual content. For example, the system can allow the user to access and view the physical locations and objects stored in the hand-held device or a computer. The user can:

1. see a bird's eye view of the physical layout and the corresponding overlay designations;

2. zoom into particular rooms and view static and movable objects;

3. select particular rooms or objects and view the current assigned virtual content;

4. add virtual content to rooms and objects that have no assigned content;

5. change the virtual content previously assigned by selecting virtual content from a library of virtual content; and 6. upload user-created content (e.g., photographs taken with the hand-held device) into the library of virtual content.

The user can also perform similar operation with the game rules.

In some embodiments, the user can take advantage of the accelerometers in the hand-held device and perform certain actions. For example, the user can perform a shaking motion for mixing or rattling virtual content. The user can use a sweeping motion for clearing or cleaning a virtual area or object. The use can also use a swing motion for throwing or hooking virtual objects.

Figure 6:
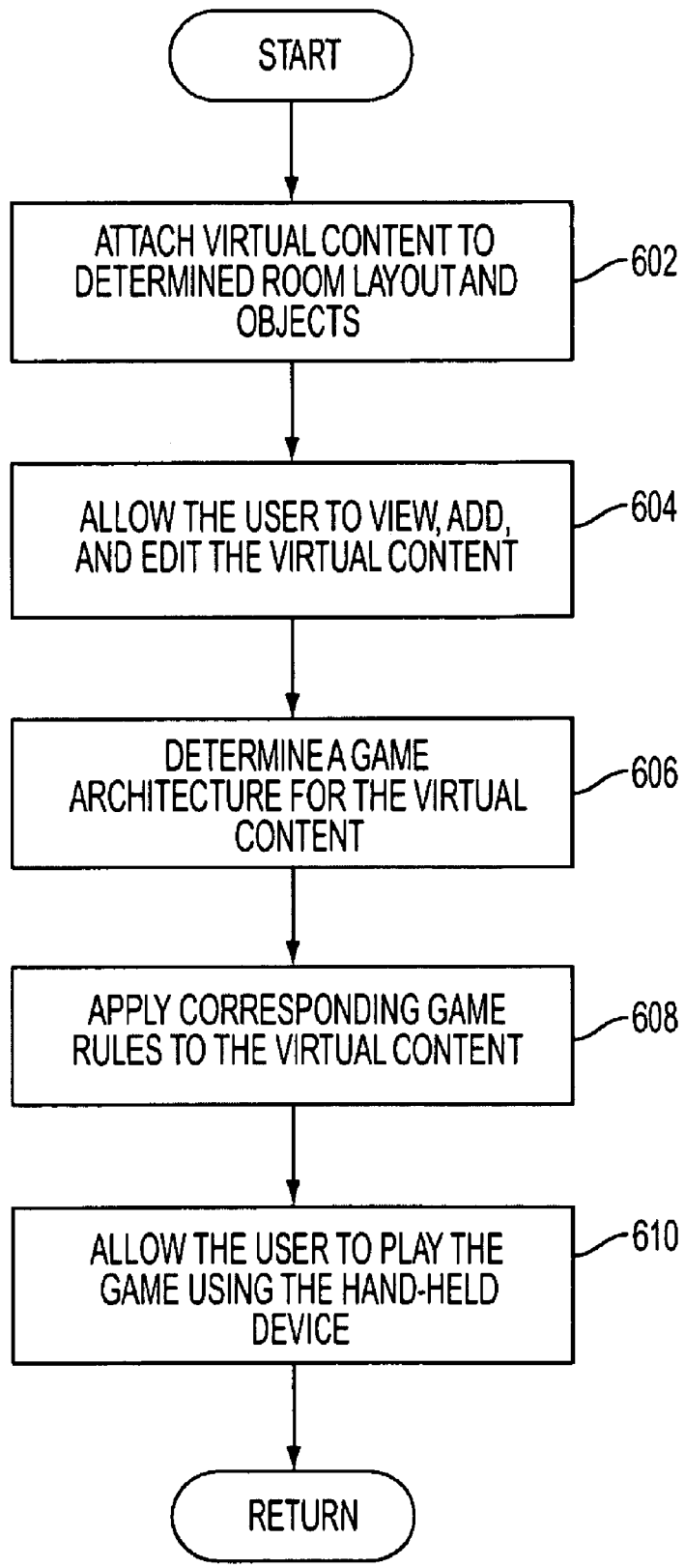
FIG. 6 presents a flowchart illustrating the process of applying a location-aware, mixed-reality gaming architecture in accordance with an embodiment of the present invention.

FIG. 6 presents a flowchart illustrating the process of applying a location-aware, mixed-reality gaming architecture in accordance with an embodiment of the present invention. After determining the room layout and object location, the system attaches virtual content to the room layout and objects (operation 602). The system then allows the user to view, add, and edit the virtual content (operation 604).

Subsequently, the system determines a game architecture for the virtual content (operation 606). The system then applies the corresponding game rules to the virtual content (option 608). In one embodiment, the system optionally allows the user to view, edit, and add game rules. Next, the system allows the user to play the game using the hand-held device (operation 610).

Exemplary System

Figure 7:
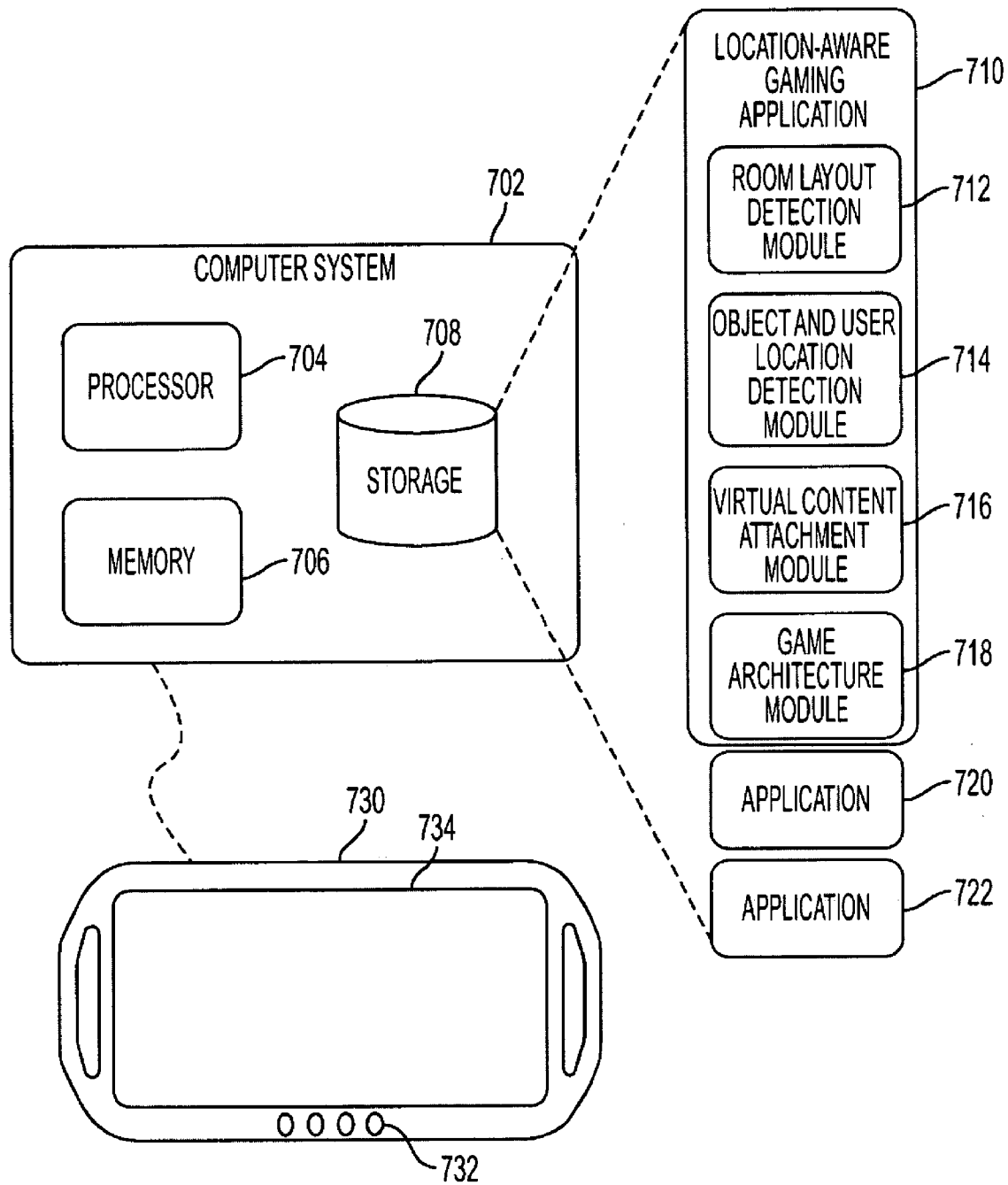
FIG. 7 illustrates a computer system that facilitates a location-aware, mixed-reality gaming platform in accordance with one embodiment of the present invention.

FIG. 7 illustrates a computer system that facilitates a location-aware, mixed-reality gaming platform in accordance with one embodiment of the present invention. In this example, a hand-held gaming device 730 includes a touchscreen display 734 and a set of input buttons 732. Also included in hand-held device 730 is a computer system 702. Computer system 702 includes a processor 704, a memory 706, and a storage device 708. Storage device 708 stores a location-aware gaming application 710 as well as applications 720 and 722. Location-aware gaming application 710 further includes a room layout detection module 712, an object and user location detection module 714, a virtual content attachment module 716, and a game architecture module 718.

During operation, location-aware gaming application 710, which includes modules 712, 714, 716, and 718, is loaded from storage device 708 into memory 706 and executed by processor 704. In turn, processor 704 performs one or more aforementioned operations to facilitate a location-aware, mixed-reality gaming platform.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating a location-aware, mixed-reality gaming platform, the method comprising:
    determining, by a computer, a physical layout of a user's actual surroundings;
    detecting, by the computer, the user's location and a plurality of nearby objects;
    generating an alternate virtual reality from the determined physical layout by assigning each of a plurality of virtual objects, with an alternate virtual content to each object in the plurality of detected nearby objects, wherein each virtual object has a meaning different from that of the detected nearby object to which it is assigned;
    associating a set of game rules with the alternate virtual reality; and
    producing a visual representation of a game to the user based on the game rules and the alternate virtual reality, wherein the game rules are associated with interactions between the user and the alternate virtual reality, and correspond to the user's surroundings and location within the determined physical layout.

2. The method of claim 1, wherein determining the physical layout of the user's surroundings comprises computing the dimensions of a room by triangulation based on wireless signals.

3. The method of claim 2, wherein determining the physical layout of the user's surroundings further comprises determining a reference point based on the wireless signals.

4. The method of claim 1, wherein detecting nearby objects comprises detecting Radio-frequency Identification (RFID) signals from RFID tags attached to the objects and inferring the object locations based on the current location of a system performing the method and the RFID signals.

5. The method of claim 1,
    wherein the alternate virtual reality includes at least one of:
        a person;
        an event;
        an object; and
        a place; and
    wherein the virtual content further includes a digital record that carries visual, audio, or textual information.

6. The method of claim 1, further comprising allowing the user to review, edit, and add to the alternate virtual reality.

7. The method of claim 1, further comprising allowing the user to review, edit, and add to the game rules.

8. A non-transitory computer-readable medium storing instructions which when executed by a computer cause the computer to perform a method for facilitating a location-aware, mixed-reality gaming platform, the method comprising:
    determining, by a computer, a physical layout of a user's actual surroundings;
    detecting, by the computer, the user's location and a plurality of nearby objects;
    generating an alternate virtual reality from the determined physical layout by assigning each of a plurality of a virtual objects, with an alternate virtual content to each object in the plurality of detected nearby objects, wherein each virtual object has a meaning different from that of the detected nearby object to which it is assigned;
    associating a set of game rules with the alternate virtual reality; and
    producing a visual representation of a game to the user based on the game rules and the alternate virtual reality, wherein the game rules are associated with interactions between the user and the alternate virtual reality, and correspond to the user's surroundings and location within the determined physical layout.

9. The computer-readable medium of claim 8, wherein determining the physical layout of the user's surroundings comprises computing the dimensions of a room by triangulation based on wireless signals.

10. The computer-readable medium of claim 8, wherein determining the physical layout of the user's surroundings further comprises determining a reference point based on the wireless signals.

11. The computer-readable medium of claim 8, wherein detecting nearby objects comprises detecting RFID signals from RFID tags attached to the objects and inferring the object locations based on the current location of a system performing the method and the RFID signals.

12. The computer-readable medium of claim 8,
    wherein the alternate virtual reality includes at least one of:
        a person;
        an event;
        an object; and
        a place; and
    wherein the virtual content further includes a digital record that carries visual, audio, or textual information.

13. The computer-readable medium of claim 8, further comprising allowing the user to review, edit, and add to the alternate virtual reality.

14. The computer-readable medium of claim 8, further comprising allowing the user to review, edit, and add to the game rules.

15. A computer system for facilitating a location-aware, mixed-reality gaming platform, the computer system comprising:
    a processor;
    a memory coupled to the processor;
    a layout-determination mechanism configured to determine a physical layout of a user's actual surroundings;
    a user location and object detection mechanism configured to detect the user's location and a plurality of nearby objects;
    a replacement virtual-reality-generation mechanism configured to generate alternate virtual reality from the determined physical layout by assigning each of a plurality of virtual objects object, with an alternate virtual content to each object in the plurality of detected nearby objects, wherein each virtual object has a meaning different from that of the detected nearby object to which it is assigned;

a game-rule-association mechanism configured to associate a set of game rules with the alternate virtual reality; and a graphical user interface (GUI) configured to produce a visual representation of a game to the user based on the game rules and the alternate virtual reality, wherein the game rules are associated with interactions between the user and the alternate virtual reality, and correspond to the user's surroundings and location within the determined physical layout.

16. The computer system of claim 15, wherein while determining the physical layout of the user's surroundings, the layout-determination mechanism is further configured to compute the dimensions of a room by triangulation based on wireless signals.

17. The computer system of claim 16, wherein while determining the physical layout of the user's surroundings, the layout-determination mechanism is further configured to determine a reference point based on the wireless signals.

18. The computer system of claim 15, wherein while detecting nearby objects, the detection mechanism is configured to detect RFID signals from RFID tags attached to the objects and to infer the object locations based on the current location of the computer system and the RFID signals.

19. The computer system of claim 15,
wherein the alternate virtual reality includes at least one of:
a person;
an event;
an object; and
a place; and
wherein the virtual content further includes a digital record that carries visual, audio, or textual information.

20. The computer system of claim 15, further comprising a virtual-reality-editing mechanism configured to allow the user to review, edit, and add to the alternate virtual reality.

21. The computer system of claim 15, further comprising a game-rule-editing mechanism configured to allow the user to review, edit, and add to the game rules.

* * * * *